United States Patent
Gustison

[15] 3,658,511
[45] Apr. 25, 1972

[54] UPGRADING THE TANTALUM AND COLUMBIUM CONTENTS OF OXIDIC METALLURGICAL PRODUCTS

[72] Inventor: Robert A. Gustison, Reading, Pa.
[73] Assignee: Kawecki Berylco Industries, Inc., New York, N.Y.
[22] Filed: Dec. 22, 1969
[21] Appl. No.: 887,424

[52] U.S. Cl. ............................. 75/101 R, 75/24 R, 75/121 R
[51] Int. Cl. .............................................. C22b 51/00
[58] Field of Search ....................... 75/101, 121, 24

[56] References Cited

UNITED STATES PATENTS 3,300,297  1/1967  Fields ............................................. 75/24
1,511,785  10/1924  Tainton ........................................ 75/101

FOREIGN PATENTS OR APPLICATIONS 956,614  4/1964  Great Britain ............................ 75/101

Primary Examiner—L. Dewayne Rutledge
Assistant Examiner—G. T. Ozaki
Attorney—Pennie, Edmonds, Morton, Taylor and Adams

[57] ABSTRACT

The mineral acid leaching of a tin slag or other metallurgical product containing tantalum and columbium oxides as well as a significant amount of silica is improved, with resulting increase in the total content of tantalum and columbium oxides in the leached product obtained by filtration, by adding a controlled amount of hydrofluoric acid prior to the filtration.

4 Claims, No Drawings

UPGRADING THE TANTALUM AND COLUMBIUM CONTENTS OF OXIDIC METALLURGICAL PRODUCTS

This invention relates to the upgrading of the tantalum and columbium components of metallurgical slags or concentrates containing these components.

In an established process for upgrading the tantalum and columbium contents of tin slags, which in a representative tin smelting slag may total about 7 to 9% as $M_2O_5$, the slag is first smelted with carbon to convert the tantalum and columbium components of the tin slag to their respective carbides, the resulting slag waste product is poured off from the residual solid carbide-containing product, and this carbide product is again smelted with added iron oxide to convert the tantalum and columbium carbides to their respective oxides suspended in a liquid slag and a molten iron phase. The resulting slag product, after solidification, is ground and then leached with an aqueous hydrochloric acid or sulfuric acid solution to remove enough iron and other components indigenous to the tin slag to form a filter product containing the tantalum and columbium oxides in an amount now totaling about 30 to 35% of the filter product. However, the filtering is made extremely slow by the nature of the leached materials and particularly by the silica indigenous to the tin slag.

Although the difficulty in filtering the aforementioned mineral acid-leached mass is readily attributable to the presence of the gelatinous silica in the leached mass, and although it is well known that hydrofluoric acid will dissolve the silica, it is equally well-known that hydrofluoric acid attacks both tantalum oxide and columbium oxide about as vigorously as it does silica. Thus, although hydrofluoric acid has been added heretofore to the mineral acid leaching of silica-containing tantalum and columbium carbide products in order to dissolve the bothersome silica prior to filtering, the added hydrofluoric acid did not attack the carbides which were the desired residue product of the filtering operation. In the case of mineral acid leaching of metallurgical products containing tantalum or columbium oxide, or both, which are also to be left as a recoverable residue from the leaching step, hydrofluoric acid has been considered undesirable because of its propensity for attacking tantalum and columbium oxides and thus causing a loss of these valuable components into the leach liquor. Consequently, the difficulty in filtering the mineral and leach product has been tolerated and hydrofluoric acid has been used in a subsequent leaching step to lower the silica content of the desired product as described in British Pat. No. 956,614.

Purely out of curiosity, I added a minor amount of hydrofluoric acid to the aqueous mineral acid leaching agent for the aforementioned type of silica-containing tantalum and columbium oxide product and found that it did in fact attack both the silica and the tantalum and columbium oxides. By varying the amount of hydrofluoric acid added to the leaching solution, I discovered that when the HF content of the leaching solution did not exceed that amount stoichiometrically equivalent to the silica (expressed as $H_2SiF_6$) present in the product to be leached, the HF preferentially attacked the silica and left the tantalum and columbium oxides suprisingly unscathed.

This unexpected concept is applicable to the mineral acid leaching of oxidic metallurgical slags ranging from Eastern-type tin slags containing about 6–12 percent total $Ta_2O_5$ and $Cb_2O_5$ ($M_2O_5$), Geomines-type tin slags containing 10–20% $M_2O_5$, and upgraded metallurgical concentrates containing about 15–40% $M_2O_5$. The mineral acids used for such leaching are generally hydrochloric or sulfuric acid (5% by weight solutions or more) or mixtures of these acids (5% by weight solutions or more), and it is characteristic of them that they effectively attack and solubilize a major proportion of the oxides other than the tantalum and columbium oxides. The unattacked oxides, due largely to the presence of the silica liberated from other metal oxides except when treated according to U.S. Pat. No. 3,300,297, are a gelatinous mass that is difficult to filter under laboratory conditions and nearly impossible to filter under commercial scale conditions.

The hydrofluoric acid can be added to the mineral acid leaching solution, pursuant to the invention, in any aqueous concentration, although I find it to be most practical to add it in the form of commercially available 70% HF hydrofluoric acid. The hydrofluoric acid can be added to the mineral acid leaching solution either prior to leaching, during leaching, or after leaching has been substantially completed, but in any event it must be added prior to filtration separation of the acid leaching residue.

The following comparative leaching operations illustrate the effectiveness of the improved operation pursuant to the present invention. In making these tests, a typical Malaysian tin slag of the following composition in % by weight was used in making the upgraded product:

| | | | | | |
|---|---|---|---|---|---|
| $Ta_2O_5$ | 4% | $TiO_2$ | % | MgO | 0.5% |
| $Cb_2O_5$ | 4% | $Al_2O_3$ | 9% | $MnO_2$ | 0.5% |
| $Fe_2O_3$ | 11% | $WO_3$ | 8% | SnO | 0.5% |
| $SiO_2$ | 21% | $ZrO_2$ | 3% | $V_2O_5$ | 0.5% |
| CaO | 25% | | | | |

By smelting this slag with enough coke to convert the tantalum and columbium oxides of the slag to their respective carbides and subsequently smelting the resulting solid carbide product with sufficient iron oxide to convert the tantalum and columbium carbides to their respective oxides, three representative oxidic dry process concentrates (DPC) were made having the following compositions in % by weight:

| Component | A | B | C |
|---|---|---|---|
| $Ta_2O_5$ | 13.1 | 13.6 | 13.8 |
| $Cb_2O_5$ | 15.0 | 14.9 | 15.6 |
| Fe | 7.0 | 4.7 | 5.5 |
| Ti | 8.7 | 8.1 | 7.1 |
| Ca | 9.3 | 10.0 | 9.6 |
| Si | 7.2 | 8.0 | 7.4 |
| Al | 3.8 | 4.2 | 3.7 |

In the first leach test, 1,800 pounds of dry process concentrate A were mixed with 510 gallons of 32% HCl, 108 gallons of 70% HF and 1,220 gallons of water. This HF content of the leaching solution was about 5% by weight of the solution and significantly exceeded the $SiO_2$ content of product A. The 1,800 lbs. of product A were added to the leach solution over a 60-minute period, after which the solution was heated to 185° F. over a period of 150 minutes. The slurry was held at 185° F. for 4 hours and was then cooled to about 110° F. before filtering. The slurry was filtered through a 468 sq. ft. filter press in 58 minutes, was repulped in 1,800 gallons of water, was then agitated for 2 hours and was re-filtered.

In the second and third leach tests, the leached materials were the aforementioned dry process concentrates B and C, respectively, and the amount of charge and of leach solution were the same as in the first test except that only 750 pounds of 70% HF were used. This amount of HF corresponded to 3.3% by weight of the leach solution and was substantially that amount of HF stoichiometrically equivalent to the $SiO_2$ content of the leached material.

In each of the three tests, the filterability of the leached mass was equally satisfactory and was characterized by a leach of that gelatinous quality of similarly leached mass obtained under substantially identical conditions except for the absence of HF from the leaching solution. However, the loss of tantalum and columbium oxides in the leach liquor differed considerably as shown in the following table:

| Acid leach liquor | First test Lbs. | First test Percent | Second test Lbs. | Second test Percent | Third test Lbs. | Third test Percent |
|---|---|---|---|---|---|---|
| $Ta_2O_5$, g./l. | 94 | 6.3 | 13 | 0.88 | 9 | 0.6 |
| $Ta_2O_5$ lost, percent | | 39.8 | | 5.4 | | 3.7 |
| $Cb_2O_5$, g./l. | 179 | 11.9 | 21 | 1.4 | 22 | 1.5 |
| $Cb_2O_5$ lost, percent | | 66.3 | | 7.8 | | 8.1 |

It will be readily appreciated, from the foregoing evidence, that the use of an amount of hydrofluoric acid substantially stoichiometrically equivalent to the indigenous silica content of oxidic metallurgical slags containing tantalum or columbium oxide, will impart to an aqueous mineral acid leaching solution the ability to attack the silica selectively without seriously attacking the normally hydrofluoric acid-soluble oxides of tantalum and columbium. The result of this unexpected selectivity is that the gelatinous character of the leached mass, normally such as to make filtering commercially infeasible, is substantially eliminated by the use of the hydrofluoric acid.

I claim:

1. In the aqueous mineral acid leaching of an oxidic metallurgical product containing at least one refractory metal oxide of the group consisting of tantalum and columbium oxides and further containing indigenous silica wherein the presence of the silica impairs the filterability of the acid-leached mass, the improvement which comprises incorporating in the aqueous mineral acid used for leaching an amount of hydrofluoric acid expressed as HF, substantially stoichiometrically equivalent to the silica content, expressed as $SiO_2$, of the metallurgical product being leached with resulting improvement in the filterability of the leached mass.

2. The method according to claim 1 in which the metallurgical product being treated contains about 6–12% by weight total $Ta_2O_5$ and $Cb_2O_5$.

3. The method according to claim 1 in which the metallurgical product being treated contains about 10–20% by weight total $Ta_2O_5$ and $Cb_2O_5$.

4. The method according to claim 1 in which the metallurgical product being treated is a metallurgical concentrate containing about 15–40% by weight total $Ta_2O_5$ and $Cb_2O_5$.

* * * * *